(12) United States Patent
Staton

(10) Patent No.: US 12,220,097 B1
(45) Date of Patent: Feb. 11, 2025

(54) CLEANING APPLICATOR SYSTEMS AND METHODS

(71) Applicant: Newtonoid Technologies, L.L.C., Liberty, MO (US)

(72) Inventor: Fielding Staton, Liberty, MO (US)

(73) Assignee: Newtonoid Technologies, L.L.C., Liberty, MO (US)

(*) Notice: Subject to any disclaimer, the term of this patent is extended or adjusted under 35 U.S.C. 154(b) by 483 days.

(21) Appl. No.: 17/651,791

(22) Filed: Feb. 19, 2022

Related U.S. Application Data

(60) Provisional application No. 63/152,170, filed on Feb. 22, 2021.

(51) Int. Cl.
| | | |
|---|---|---|
| *A47L 13/16* | (2006.01) | |
| *A47L 13/42* | (2006.01) | |
| *C11D 17/04* | (2006.01) | |
| *G05D 23/19* | (2006.01) | |
| *G06F 3/16* | (2006.01) | |
| *H04R 1/02* | (2006.01) | |
| *H04R 1/40* | (2006.01) | |
| *H04R 3/12* | (2006.01) | |
| *A47L 13/46* | (2006.01) | |
| *B03D 1/018* | (2006.01) | |

(52) U.S. Cl.
CPC ............ *A47L 13/42* (2013.01); *A47L 13/16* (2013.01); *C11D 17/049* (2013.01); *G05D 23/19* (2013.01); *G06F 3/165* (2013.01); *H04R 1/028* (2013.01); *H04R 1/403* (2013.01); *H04R 3/12* (2013.01); *A47L 13/46* (2013.01); *B03D 1/018* (2013.01)

(58) Field of Classification Search
CPC .......... A47L 13/46; A47L 13/16; A47L 13/10; B03D 1/018
See application file for complete search history.

(56) References Cited

U.S. PATENT DOCUMENTS

| | | | | |
|---|---|---|---|---|
| 1,539,857 | A * | 6/1925 | Martin | A47L 13/46 15/147.1 |
| 8,087,121 | B1 * | 1/2012 | Michelson | A47L 13/14 15/228 |
| 2011/0232680 | A1 * | 9/2011 | Gonzales | B32B 27/36 15/244.4 |
| 2013/0048017 | A1 * | 2/2013 | Rauwald | A47L 11/4038 451/527 |

(Continued)

*Primary Examiner* — Michael D Jennings
(74) *Attorney, Agent, or Firm* — AVEK IP, LLC

(57) ABSTRACT

An applicator is provided for use with a cleaning pad having Melamine resin foam that converts energy from waves or vibrations into heat. The applicator includes a handheld base and an energy emitter. The handheld base is configured to receive the cleaning pad, and the energy emitter selectively provides waves or vibrations to the cleaning pad for heating the Melamine resin foam. A cleaning applicator system includes a cleaning medium and an applicator. The cleaning medium has a Melamine resin foam body that converts energy from waves or vibrations into heat. The applicator has a platform, a handle extending from the platform, an energy emitter, and a computing system in communication with the energy emitter. The cleaning medium is coupled to the applicator, and the energy emitter provides waves or vibrations to the Melamine resin foam body to heat the Melamine resin foam body.

21 Claims, 6 Drawing Sheets

(56) References Cited

U.S. PATENT DOCUMENTS

| | | | |
|---|---|---|---|
| 2014/0305469 A1* | 10/2014 | Pung | C11D 17/0039 |
| | | | 15/104.93 |
| 2020/0046194 A1* | 2/2020 | Busby | B32B 7/12 |
| 2020/0100641 A1* | 4/2020 | Konkey | A47L 13/16 |
| 2020/0337514 A1* | 10/2020 | Miller | A46B 15/0081 |
| 2020/0383550 A1* | 12/2020 | Longoria | A47L 13/256 |
| 2023/0053562 A1* | 2/2023 | Ryan | B03D 1/018 |

* cited by examiner

CLEANING APPLICATOR SYSTEMS AND METHODS

CROSS-REFERENCE TO RELATED APPLICATIONS

This application claims the benefit of priority of U.S. Provisional Patent Application No. 63/152,170, filed Feb. 22, 2021, the entire disclosure of which is incorporated herein by reference.

FIELD OF THE DISCLOSURE

The disclosure relates generally to the field of cleaning applicator systems. An embodiment of the disclosure relates more specifically to cleaning applicator systems employing waves to propagate energy through a foam medium.

SUMMARY

The following presents a simplified summary of the disclosure in order to provide a basic understanding of some aspects of the invention. This summary is not an extensive overview of the invention. It is not intended to identify the critical elements of the invention or to delineate the scope of the invention. Its sole purpose is to present some concepts of the invention in a simplified form as a prelude to the more detailed description that is presented elsewhere herein.

According to an embodiment, a cleaning applicator system includes a cleaning medium and an applicator. The cleaning medium has a Melamine resin foam body that converts energy from waves or vibrations into heat. The applicator has a platform, a handle operably extending from the platform, an energy emitter, and a computing system in communication with the energy emitter. The cleaning medium is coupled to the applicator, and the energy emitter provides waves or vibrations to the Melamine resin foam body to heat the Melamine resin foam body.

According to another embodiment, an applicator for use with a cleaning medium includes a handheld base and an electroacoustic transducer. The handheld base is configured to receive the cleaning medium, and the electroacoustic transducer is coupled to the handheld base for providing sound waves to the cleaning medium.

According to still another embodiment, an applicator is provided for use with a cleaning pad having Melamine resin foam that converts energy from waves or vibrations into heat. The applicator includes a handheld base and an energy emitter. The handheld base is configured to receive the cleaning pad, and the energy emitter selectively provides waves or vibrations to the cleaning pad for heating the Melamine resin foam while the cleaning pad is received by the handheld base.

BRIEF DESCRIPTION OF THE DRAWINGS

Illustrative embodiments of the present disclosure are described in detail below with reference to the attached figures.

DETAILED DESCRIPTION

Figure 1:
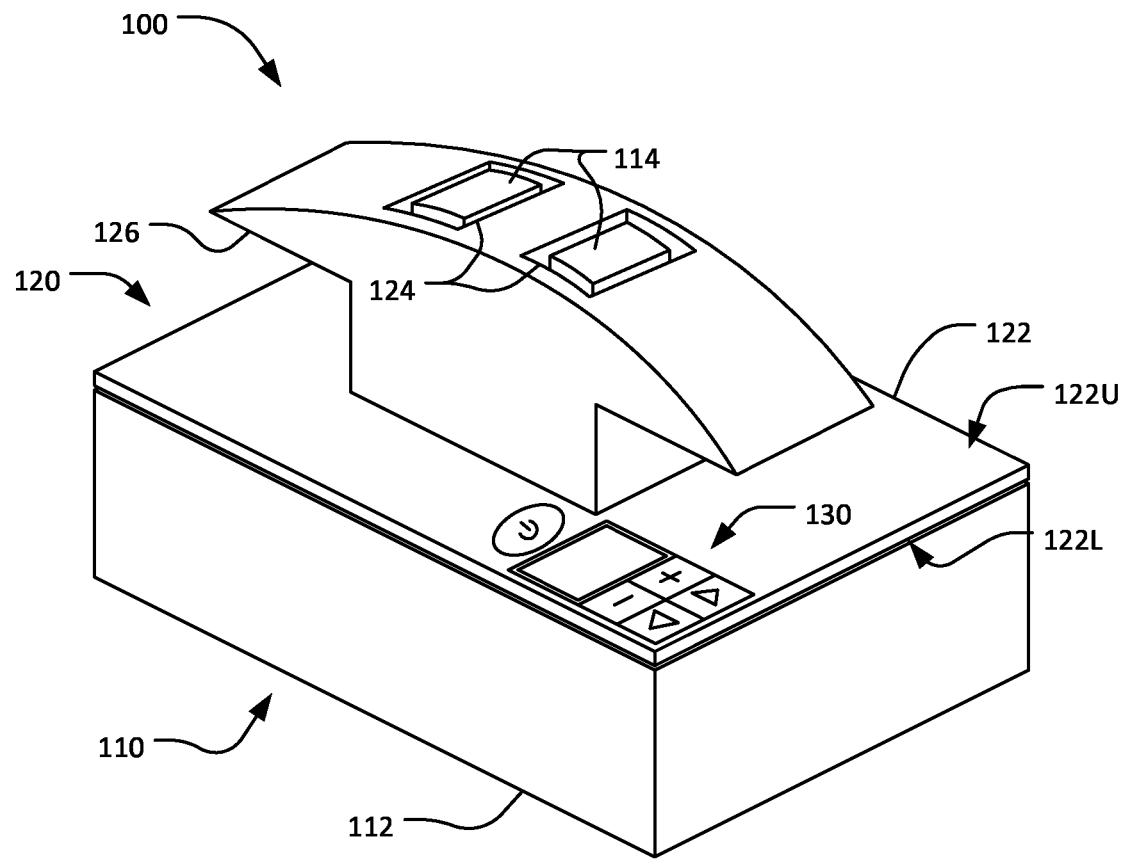
FIG. 1 is a perspective view of a cleaning applicator system employing a foam medium, according to an embodiment of the present disclosure.
Figure 2:
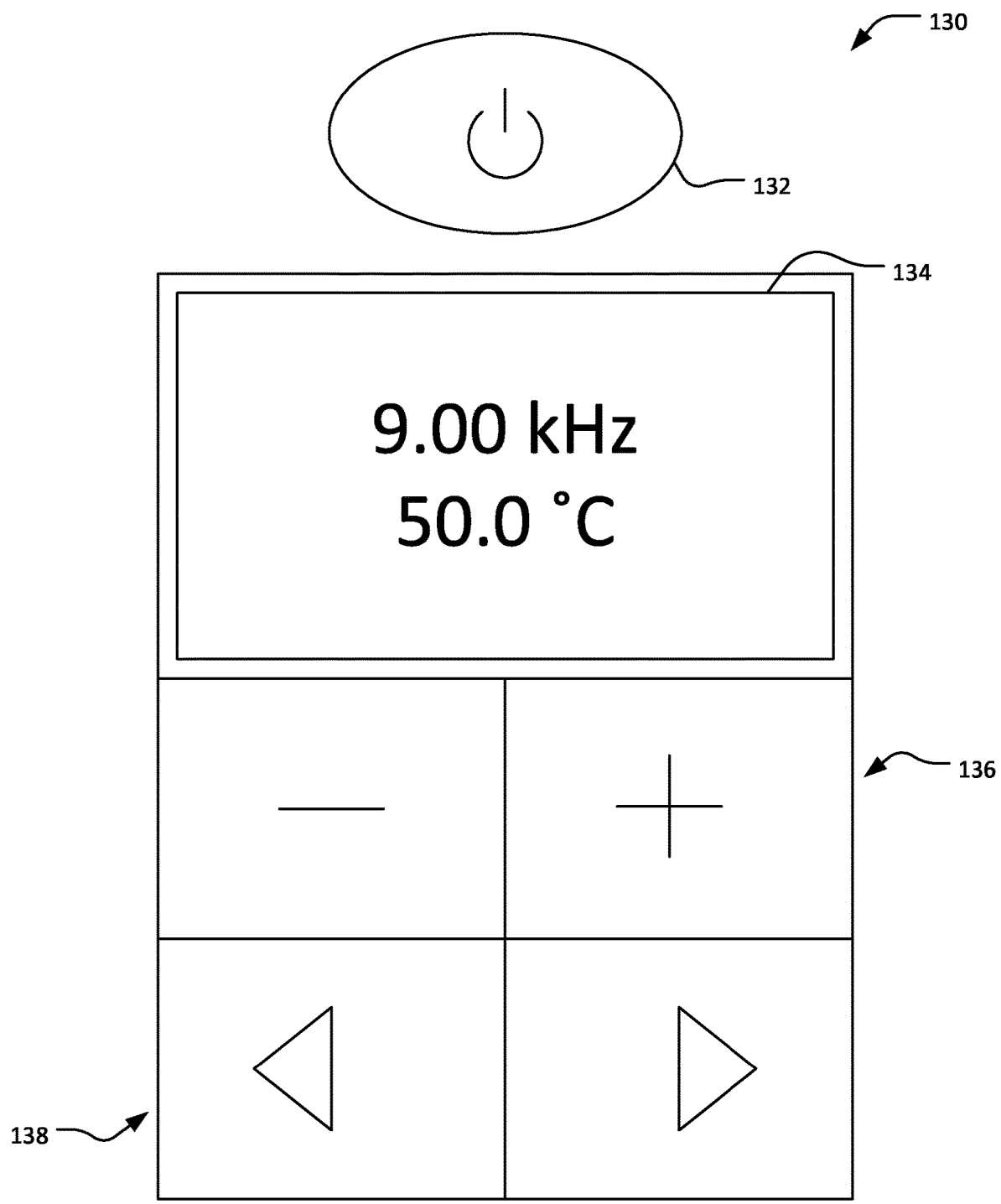
FIG. 2 is a block diagram depicting a control panel of the cleaning applicator system of FIG. 1.
Figure 3:
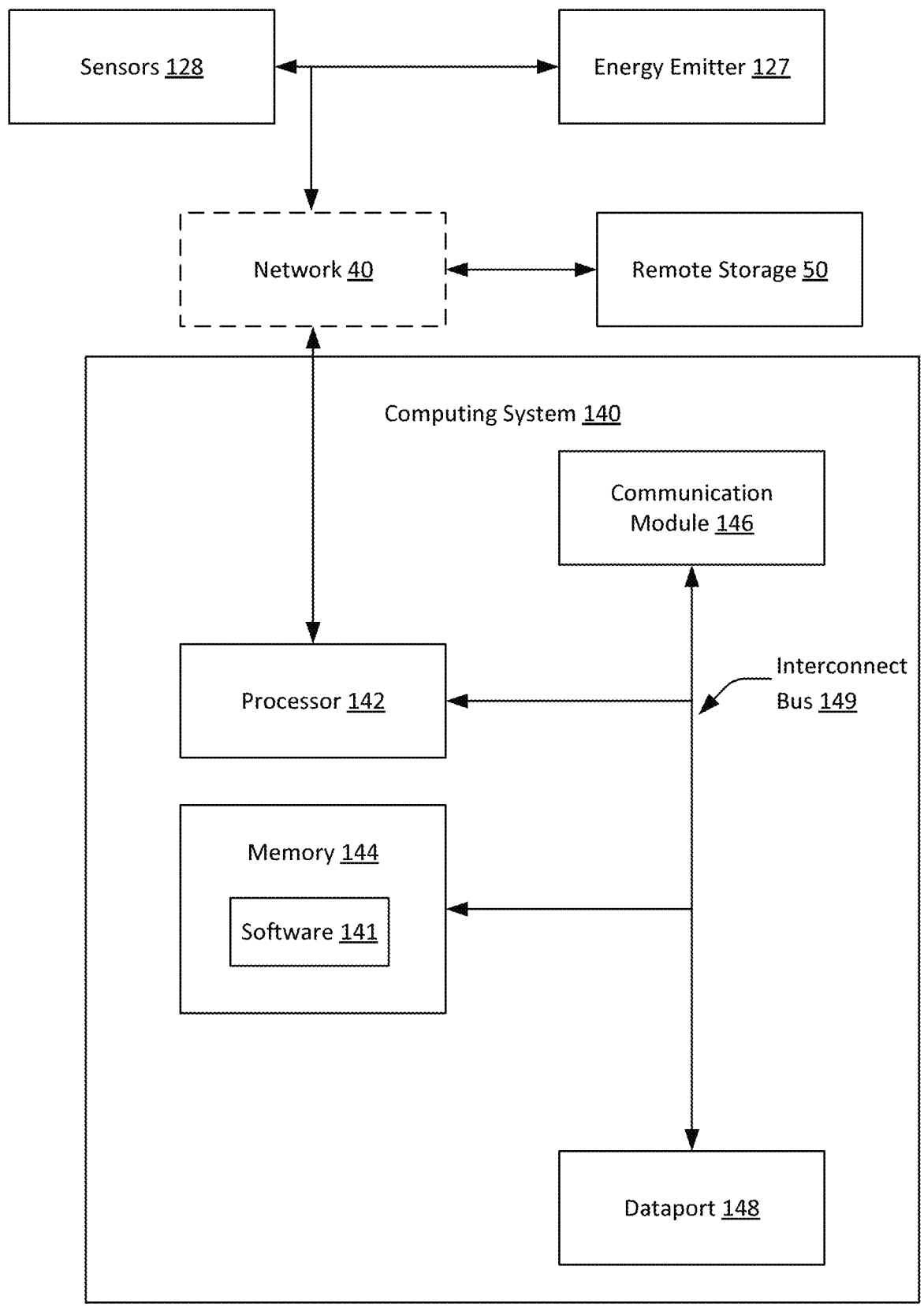
FIG. 3 is a block diagram depicting a computing system of the cleaning applicator system of FIG. 1.

FIGS. 1-3 show a cleaning applicator system according to an embodiment 100. The cleaning applicator system 100 may include a cleaning medium 110, an applicator 120, a control panel 130, and a computing system 140. In operation, the cleaning applicator system 100 may be used to perform cleaning tasks, such as removing undesirable substances (e.g., dirt, grease, grime, makeup, rust, teeth stains, etc.) from surfaces or substrates. The applicator 120 may releasably or fixedly retain the cleaning medium 110 while providing a grip for a user to hold onto during the cleaning task. Further, the applicator 120 may propagate energy (e.g., waves, vibrations, etc.) through the cleaning medium 110 during the cleaning task in order to increase the efficacy of the cleaning medium 110.

The cleaning medium 110 may include a foam body or block 112 and one or more attachment members 114. The foam body 112 may have, for example, an open-celled foam structure that is made from any suitable material now known or subsequently developed. In embodiments, the foam body 112 may be made from a Melamine ($C_3H_6N_6$) resin. An open-celled foam body 112 constructed of Melamine resin may have the desirable properties of being both flexible and hard, which may enable the foam body 112 to readily remove substances from surfaces that may be otherwise difficult to remove. The foam body 112 may be of any suitable shape and/or size and may be dictated or influenced by such things as its intended use and packaging considerations. Examples include a rectangular prism as shown in FIG. 1 (which may be used for general-purpose or specific-purpose cleansing), a makeup cleansing pad, and a dental applicator. It may be particularly desirable for a shape and/or size of the applicator 120 to correspond with the shape and/or size of the foam body 112.

Conventional Melamine resin foam blocks typically rely on contact with moisture (e.g., water) to increase their efficacy. This may be problematic in cleaning tasks where the surface to be cleaned is sensitive to moisture. Embodiments of the foam body 112 described herein may alternately or additionally rely on other methods to increase its efficacy.

Figure 4:
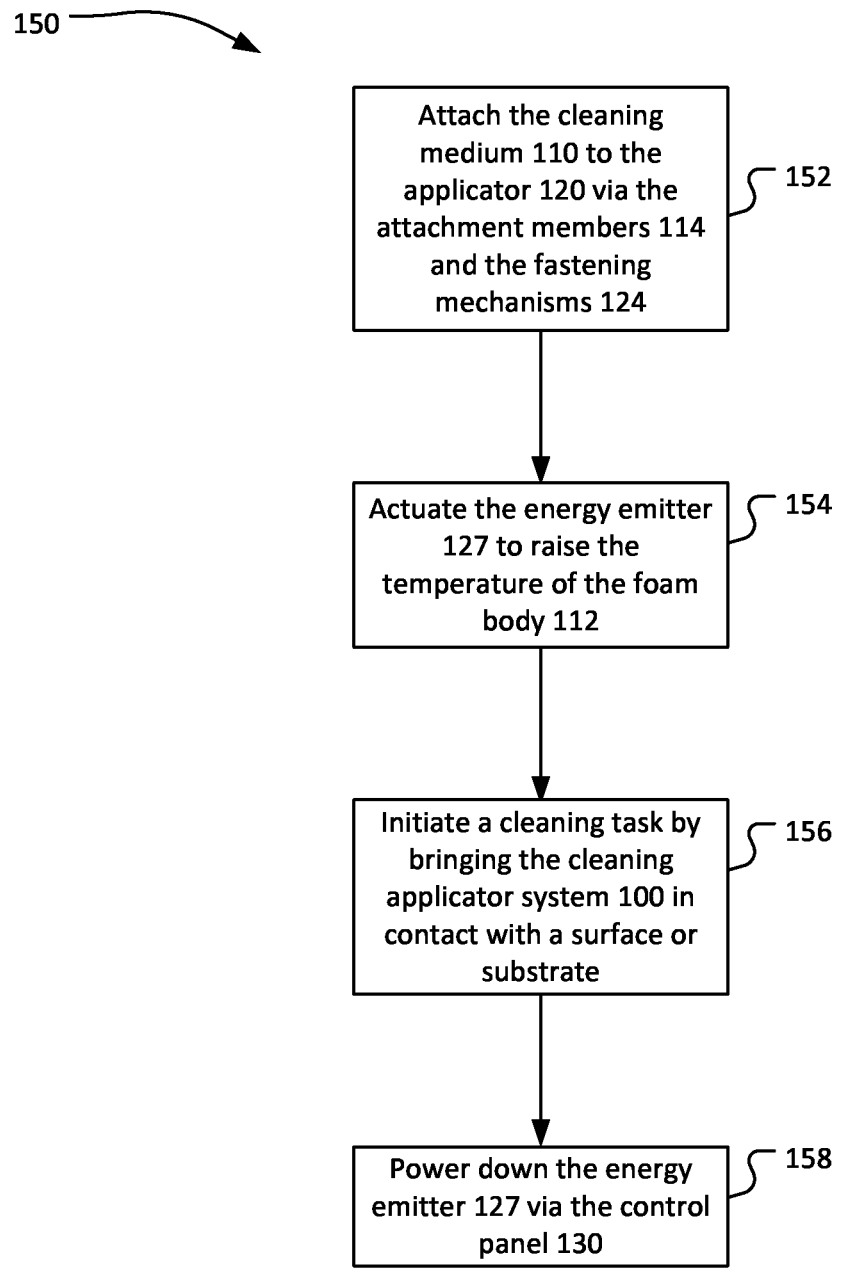
FIG. 4 is a flowchart illustrating a method for using the cleaning applicator system of FIG. 1, in an embodiment.

One property of the Melamine resin foam body 112 is that the foam body 112 is effective at converting energy (e.g., sound waves or vibrations) to heat. Therefore, the foam body 112 may rise in temperature as the foam block 112 absorbs waves or vibrations, such as those generated by an energy emitter (FIG. 4). A foam body 112 having a higher temperature may realize an increase in cleaning efficacy when compared to a foam body 112 having a lower temperature. To effectuate this increase in cleaning efficacy, the foam body 112 may receive sound waves, or other forms of energy, from the applicator 120.

The one or more attachment members 114 of the cleaning medium 110 may allow the foam body 112 to fixedly or releasably attach to the applicator 120 (e.g., a corresponding fastening structure 124 thereof). For example, the attachment members 114 may be one or more buckles that clasp with corresponding buckles of the applicator 120 to retain the cleaning medium 110. Releasably attaching the cleaning medium 110 to the applicator 120 may allow a user to replace the cleaning medium 110 when the foam body 112 thereof becomes worn or otherwise less effective.

The applicator 120 may include a platform 122, one or more fastening mechanisms 124, a handle 126, and a control panel 130. In embodiments, the applicator 120 may house the computing system 140 (e.g., some or all parts thereof), an energy emitter 127, and a sensor 128 (FIG. 4). In operation, the applicator 120 may provide an ergonomic handhold for the cleaning medium 110 while housing the electronics necessary to actuate and control the energy emitter 127. The energy emitter 127 may be used to produce the waves or vibrations that the foam body 112 may convert to heat.

The platform 122 may be sized and/or shaped correspondingly to the size and/or shape of the foam body 112, and may be located upwardly adjacent thereof when the applicator 120 is fixedly or releasably joined to the cleaning medium 110. Various electronics of the cleaning applicator system 100 (e.g., the computing system 140, the energy emitter 127, the sensors 128, the control panel 130, etc.) may be housed in or on the platform 122. For example, the energy emitter 127 may be located on or near a lower face 122L of the platform 122 such that the energy emitter 127 may readily propagate energy (e.g., sound waves) through the foam body 112. As in another example, the control panel 130 may be located on an upper face 122U of the platform 122 such that a user may readily access the control panel 130.

The energy emitter 127 may be any suitable device now known or subsequently developed that is configured to produce and transmit energy, such as waves (e.g., sound waves) or vibrations. The energy emitter 127 may be, for example, one or more speakers configured to produce sound waves. The sound waves produced may be within the range of human hearing (e.g., about 20 Hz to 20 kHz) and/or the outside the range of human hearing (i.e., inaudible to human ears). In embodiments, the sound waves, or other type of energy produced, may be controlled manually, such as through button presses on the control panel 130 made by the user. Alternately or additionally, the energy generated may be controlled automatically, such as through the coordination of the computing system 140 and readings taken with the sensor 128.

As discussed above, the Melamine resin foam body 112 may rise in temperature as it absorbs waves or vibrations. While this rise in temperature may desirably increase the cleaning efficacy of the foam body 112, care must be taken not to raise the temperature too much. For instance, Melamine resin may withstand temperatures up to about 240° C. before the heat damages the open-celled structure of the Melamine resin foam. Therefore, care must be taken not to raise the temperature of the Melamine too high. The sensor 128 may be used to avoid such undesirable circumstances. The sensor 128 may be, for example, any suitable temperature sensor now known or subsequently developed. In embodiments, the sensor 128 may read the temperature of the foam body 112, and the computing system 140 may respond to the sensor 128 reading by attenuating (e.g., automatically) the output of the energy emitter 127 when the temperature of the foam body 112 reaches a predetermined threshold (e.g., when the foam body 112 reaches a temperature that would damage the material of the foam body 112). Alternatively or additionally, the control panel 130 may display the reading taken by the sensor 128. The user may then respond to the reading displayed on the control panel 130 by manually adjusting the output of the energy emitter 127.

As shown in FIG. 2, in embodiments, the control panel 130 may include a power button 132, a display 134, and buttons 136, 138. In some embodiments, the control panel 130 may include indicator lights such as LEDs to indicate certain system 100 conditions (e.g., a red LED to indicate when the foam body 112 is overheating, a green LED to indicate when the foam body 112 is sufficiently heated and ready for cleaning, et cetera). The power button 132 may be used to actuate the energy emitter 127. The display 134 may be any suitable display now known or subsequently developed (e.g., a liquid crystal display, an LED display, a digital light processing display, etc.) and may display characteristics of the cleaning applicator system 100. For example, the display 134 may show characteristics of the foam block 112 (e.g., a temperature and/or integrity thereof), the energy emitter 127 (e.g., an output thereof), the sensor 128 (e.g., a reading thereof), et cetera. The buttons 136, 138 may be used by the user to adjust and/or set the characteristics of the cleaning applicator 100. For example, the buttons 136 may be used to adjust a temperature setting of the foam block 112 and the buttons 138 may be used to adjust an intensity of the energy emitter 127 (e.g., the wavelength and/or frequency of the waves, or the vibrational characteristics, generated by the energy emitter 127). The artisan would understand that any suitable combination and arrangement of buttons and/or displays may be utilized in the control panel 130.

Turning back now to FIG. 1, the handle 126 is shown. The handle 126 may extend from the platform 122 and may provide to the user a grip (e.g., an ergonomic grip) with which the user may manipulate the cleaning medium 110. Since the Melamine resin foam body 112 may be abrasive and/or irritable to human skin, unnecessary contact therebetween may be desirably avoided by using the handle 126. Furthermore, since the foam block 112 may reach high temperatures by converting waves or vibrations, the user may use the handle 126 and the intervening platform 122 to avoid undesirable contact between the user and a hot foam body 112.

The one or more fastening mechanisms 124 may be any suitable fastening mechanisms now known or subsequently developed, such as a buckle, a clasp, an adhesive, a bolt, a screw, et cetera. The fastening mechanisms 124 may correspond to the attachment members 114 of the foam body 112. In some embodiments, the platform 122 and/or the handle 126 may include one or more apertures for facilitating the connection of the attachment members 114 and the fastening mechanisms 124. In operation, the fastening mechanisms 124 may work with the attachment members 114 to fixedly or releasably attach the cleaning medium 110 to the applicator 120. Releasably attaching the applicator 120 and cleaning medium 110 together may allow the cleaning medium 110 to be exchanged with a new cleaning medium 110 once the old cleaning medium 110 becomes worn or otherwise unsuitable for use, thus allowing a single applicator 120 to be used with multiple cleaning mediums 110. Fixedly securing the applicator 120 and the cleaning medium 110 together, such as through the use of an adhesive, may desirably simplify cost and complexity of the cleaning applicator system 100 even though the reusability of the applicator 120 may be reduced.

FIG. 3 is a functional block diagram of the computing system 140 which may be used to implement the various cleaning applicator embodiments according to the different aspects of the present disclosure. The computing system 140 may be, for example, a smartphone, a laptop computer, a desktop computer, a flexible circuit board, or other computing device whether now known or subsequently developed. The computing system 140 may comprise a processor 142, the memory 144, a communication module 146, and a dataport 148. These components may be communicatively coupled together by an interconnect bus 149. The processor 142 may include any processor used in smartphones and/or other computing devices, including an analog processor (e.g., a Nano carbon-based processor). In certain embodiments, the processor 142 may include one or more other processors, such as one or more microprocessors, and/or one or more supplementary co-processors, such as math co-processors.

The memory 144 may include both operating memory, such as random access memory (RAM), as well as data storage, such as read-only memory (ROM), hard drives, optical, flash memory, or any other suitable memory/storage element. The memory 144 may include removable memory elements, such as a CompactFlash card, a MultiMediaCard (MMC), and/or a Secure Digital (SD) card. In certain embodiments, the memory 144 includes a combination of magnetic, optical, and/or semiconductor memory, and may include, for example, RAM, ROM, flash drive, and/or a hard disk or drive. The processor 142 and the memory 144 each may be located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 142 may be connected to the memory 144 via the dataport 148.

The communication module 146 may be configured to handle communication links between the computing system 140 and other external devices or receivers, and to route incoming/outgoing data appropriately. For example, inbound data from the dataport 148 may be routed through the communication module 146 before being directed to the processor 142, and outbound data from the processor 142 may be routed through the communication module 146 before being directed to the dataport 148. The communication module 146 may include one or more transceiver modules configured for transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, 5G, or any other protocol and/or technology.

The dataport 148 may be any type of connector used for physically interfacing with a smartphone, computer, and/or other devices, such as a USB port, a mini-USB port, an IPHONE®/IPOD® 30-pin connector or LIGHTNING® connector, et cetera. In other embodiments, the dataport 148 may include multiple communication channels for simultaneous communication with, for example, other processors, servers, and/or client terminals.

The memory 144 may store instructions for communicating with other systems, such as a computer. The memory 144 may store, for example, a program (e.g., computer program code) adapted to direct the processor 142 in accordance with the embodiments described herein. The instructions also may include program elements, such as an operating system. While execution of sequences of instructions in the program causes the processor 142 to perform the process steps described herein, hard-wired circuitry may be used in place of, or in combination with, software/firmware instructions for implementation of the processes of the present embodiments. Thus, unless expressly noted, the present embodiments are not limited to any specific combination of hardware and software.

In embodiments, the memory 144 includes software 141. The software 141 may contain machine-readable instructions configured to be executed by the processor 142. The software 141 may, for example, process data obtained from the sensor 128. In embodiments, the software 141 may cause the computing system 140 to dynamically respond to a reading obtained by the sensor 128. For example, the software 141 may direct the energy emitter 127 to produce fewer waves or vibrations and/or less intense waves or vibrations after the sensor 128 detects that the foam body 112 has become too hot. As another example, the software 141 may direct the energy emitter 127 to raise and/or lower the temperature of the foam body 112 to the temperature selected with the control panel 130.

The computing system 140 may be in data communication with a remote storage 50 over a network 40. The network 40 may be a wired network, a wireless network, or comprise elements of both. In embodiments, the network 40 may communicatively link one or more components of the cleaning applicator system 100. For example, the sensor 128 may be communicatively linked to the computing system 140 via the network 40 for the exchange of information therebetween. Thusly, one or more components of the computing system 140 may be located elsewhere besides in and/or on the applicator 120 (e.g., a platform or handle 126 thereof). The remote storage 50 may be, for example, the "cloud" or other remote storage in communication with other computing systems. In embodiments, data (e.g., readings obtained by the sensor 128 and the dynamic responses of the computing system 140 thereto) may be stored in the remote storage 50 for analytics.

FIG. 4 depicts a method 150 for operating the various embodiments of the cleaning applicator system disclosed herein. First, at step 152, the cleaning medium 110 may be attached (e.g., fixedly, releasably, etc.) with the applicator 120 by using the attachment members 114 and the fastening mechanisms 124. Then, at step 154, the user may actuate the energy emitters 127 using the control panel 130. For example, the user may use the power button 132 to turn on the energy emitter 127, and the computing system 140 and the sensors 128 may automatically bring the foam body 112 to the desired temperature, as described above. As another example, the user may use the buttons 136, 138 to set the desired characteristics of the energy emitter 127 and the foam body 112.

Next, at step 156, the user initiates a cleaning task. For example, the user may bring the cleaning medium 110 (e.g., the foam body 112 thereof) in contact with the surface to be cleaned. The user may clean the surface by applying a scrubbing motion with the handle 126. Finally, at step 158, the user may power down the cleaning applicator system 100 via the power button 132.

The steps of the method 150 may be modified, added to, and/or omitted as desired, and such considerations are contemplated and are within the scope of the present disclosure. For example, the artisan will understand that the method 150 may be readily modified to use the sensors 128 to automatically detect a temperature of the foam body 112 and adjust the output of the energy emitters 127 accordingly, such as by shutting down the energy emitter 127 once the foam block 112 exceeds a predetermined temperature. As another example, the step of replacing the cleaning medium 110 may be added where the foam body 112 thereof is determined to be no longer suitable for use. As yet another example, the method 150 steps may be modified to instead use an embodiment 200 (as described below and as shown in FIGS. 5A-5B) of the cleaning applicator system.

One advantage of the systems 100 is that it may provide a cleaning tool that uses a heated Melamine resin foam block 112 while providing protection to a user from the temperature and/or abrasive properties thereof. Further, the temperature of the foam block 112 may be readily adjusted (e.g., automatically and/or manually) via the energy emitter 127, the sensors 128, the control panel 130, and/or the computing system 140. Another advantage of the system 100 is that it may forego the need to moisturize the Melamine resin foam block 112 to increase the cleaning efficacy of the Melamine. Instead, the cleaning efficacy of the foam block 112 may be increased via the raised temperature that results from the foam block's 112 absorption of waves or vibrations generated by the energy emitter 127. Thus, the cleaning applicator system 100 may be readily used to clean surfaces or substrates that are sensitive to moisture content, where the use of conventional Melamine resin foam blocks would be undesirable. In other words, the cleaning applicator system 100 may increase its efficacy while foregoing the use of moisture (e.g., water). In some embodiments, it may be desirable to utilize both moisture and the heat produced by the absorbed waves or vibrations to further increase the efficacy of the cleaning applicator system 100.

Figure 5A:
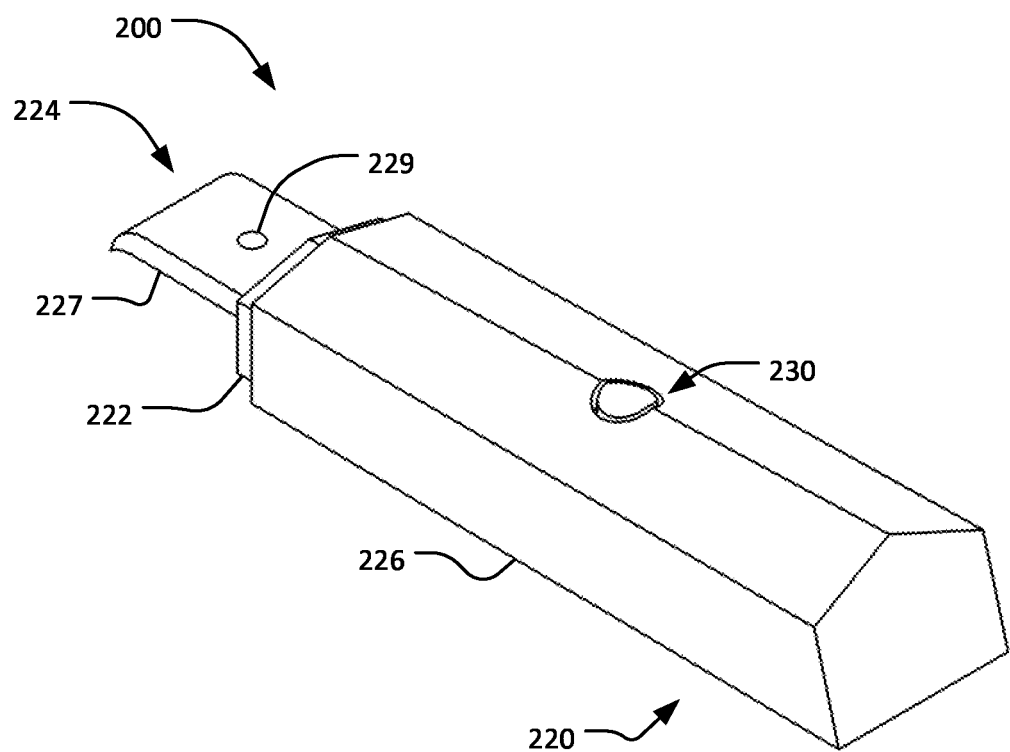
FIG. 5A is a perspective view of the cleaning applicator system, according to another embodiment of the present disclosure.
Figure 5B:
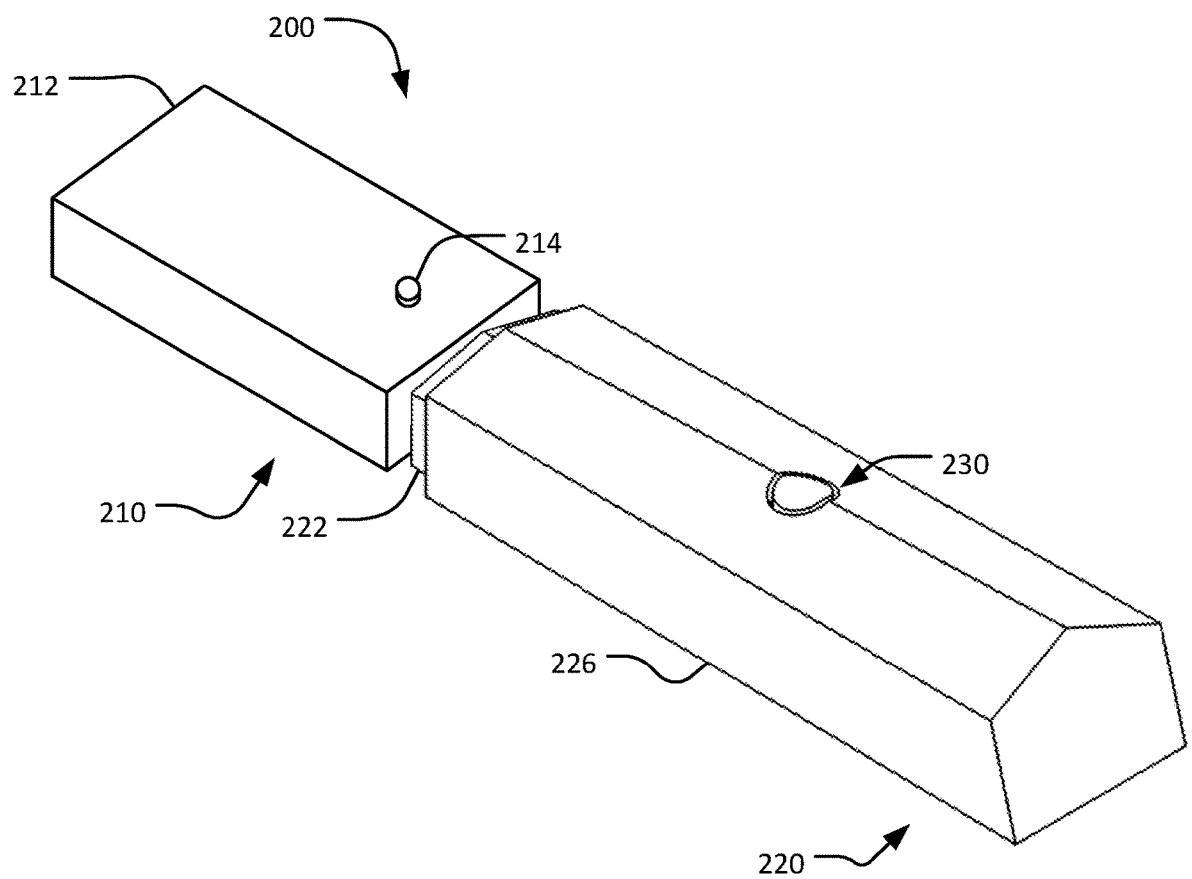
FIG. 5B is a perspective view of the cleaning medium coupled to the cleaning applicator system of FIG. 5A.

FIGS. 5A-5B schematically illustrate an embodiment 200 of the cleaning applicator system. The cleaning applicator system 200 is substantially similar to the cleaning applicator system 100, except as specifically noted and/or shown, or as would be inherent. Further, those skilled in the art will appreciate that the cleaning applicator system 100 (and thus the cleaning applicator system 200) may be modified in various ways, such as through incorporating all or part of any of the various described embodiments, for example. For uniformity and brevity, reference number 200 to 299 may be used to indicate elements corresponding to those discussed above numbered from 100 to 199 (e.g., cleaning medium 210 corresponds generally to the cleaning medium 110, applicator 220 corresponds generally to the applicator 120, control panel 230 corresponds generally to the control panel 130, etc.), though with any noted, shown, or inherent deviations. In embodiments, the cleaning applicator 200 may make use of the computing system 140.

The cleaning applicator 200 may operate in a substantially similar manner as the cleaning applicator 100. Like with the embodiment 100, the user may grip the handle 226 of the applicator 220 to use the foam block 212 of the cleaning medium 210 (FIG. 5B) in a cleaning task. One difference between the embodiments 100 and 200 is that the fastening structure 224 (FIG. 5A) may be a protrusion extending from the platform 222 and/or the handle 226. The protrusion 224 may be configured to inserted within the foam block 212. In some embodiments, the protrusion 224 may include curved, hooked, or other similar features to improve the ability of the protrusion 224 to retain the foam block 212. Alternatively or additionally, the protrusion 224 may include one or more apertures 229 for the reception of an attachment member 214 (e.g., a pin, a dowel, a key, etc.) (FIG. 5B). The attachment member 214 may serve to removably attach the cleaning medium 210 to the applicator 220 when the attachment member is passed through both the foam block 212 and the aperture 229. In this manner, the cleaning medium 210 may be readily replaced or repaired as needed.

Just as the cleaning applicator 100 uses waves (e.g., sound waves) or vibrations to propagate energy through the cleaning medium 110, the cleaning applicator 200 may alternatively or additionally propagate waves (e.g., sound waves) or vibrational energy through the cleaning medium 210. To do this, the fastening mechanism 224 itself may function as an energy emitter 227. That is, the fastening mechanism 224 may propagate waves or vibrations, causing the foam block 212 that the fastening mechanism 224 is in contact with to vibrate in turn. As described above regarding embodiment 100, the Melamine resin foam block 212 may heat up in reaction to the energy imparted to it. Thus, the cleaning efficacy of the foam block 212 may be improved regardless of the moisture content of the foam block 212. The energy emitter 127 may vibrate via any suitable known technology now known or subsequently developed, such as with an eccentric rotating mass vibration motor, a linear resonant actuator, a piezoelectric motor, et cetera.

The control panel 230 may operate similarly to the control panel 130 to actuate and/or control the output of the energy emitter 227. In some embodiments, the cleaning applicator 200 may use the computing system 140 and/or the sensor 128 to control or modify (e.g., manually, automatically) the output of the energy emitter 227. The computing system 140 and/or the sensor 128 may be housed, for example, within the applicator 220 (e.g., the handle 226 thereof).

While the disclosure focuses on the applications of Melamine resin foam, the artisan will understand from the disclosure herein that the cleaning applicator system embodiments may likewise be used with other materials other than Melamine resin that exhibit similar properties (e.g., other materials with an abrasive structure that may heat up in response to the absorption of sound waves or other forms of propagated energy).

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It will be understood that certain features and subcombinations are of utility and may be employed without reference to other features and subcombinations and are contemplated within the scope of the present disclosure. Not all steps listed in the various figures need be carried out in the specific order described.

The invention claimed is:

1. A cleaning applicator system, the system comprising:
   a cleaning medium comprising a Melamine resin foam body that converts energy from waves or vibrations into heat; and
   an applicator comprising: a platform, a handle operably extending from the platform, an energy emitter, and a computing system in communication with the energy emitter;
   wherein:
      the cleaning medium is coupled to the applicator; and
      the energy emitter provides waves or vibrations to the Melamine resin foam body to heat the Melamine resin foam body.

2. The cleaning applicator system of claim 1, wherein:
   the applicator further comprises a sensor in communication with the computing system; and the computing system uses data from the sensor to control an output property of the energy emitter.

3. The cleaning applicator system of claim 2, wherein the output property is at least one item selected from the group consisting of frequency and amplitude.

4. The cleaning applicator system of claim 2, wherein the sensor is at least one item selected from the group consisting of a temperature sensor and a pressure sensor.

5. The cleaning applicator system of claim 2, wherein the computing system is physically located in at least one item selected from the group consisting of the platform and the handle.

6. The cleaning applicator system of claim 2, further comprising a control panel in communication with the computing system.

7. The cleaning applicator system of claim 1, further comprising a control panel in communication with the computing system, the control panel being accessible from at least one item selected from the group consisting of the platform and the handle.

8. The cleaning applicator system of claim 1, wherein the waves are sound waves.

9. The cleaning applicator system of claim 1, wherein the handle operably extends from an upper surface of the platform.

10. A cleaning applicator system, the system comprising:
   a cleaning medium comprising a Melamine resin foam body; and
   an applicator for use with the cleaning medium, the applicator comprising;
      a handheld base configured to receive the cleaning medium; and
      an electroacoustic transducer coupled to the handheld base for providing sound waves to the cleaning medium.

11. The cleaning applicator system of claim 10, wherein the handheld base includes a handle and a platform configured to receive the cleaning medium.

12. The cleaning applicator system of claim 10, wherein the sound waves are not in the frequency range of 20 Hz to 20 KHz.

13. The cleaning applicator system of claim 10, wherein the sound waves are in the frequency range of 20 Hz to 20 KHz.

14. The cleaning applicator system of claim 10, wherein the electroacoustic transducer is a plurality of electroacoustic transducers.

15. The cleaning applicator system of claim 10, wherein the electroacoustic transducer is operated by at least one item selected from the group consisting of a cellular telephone and a portable computer.

16. The cleaning applicator system of claim 10, further comprising a processor in communication with the electroacoustic transducer, the controller being located in the handheld base.

17. The cleaning applicator system of claim 10, further comprising:
   a sensor; and
      a processor in communication with the electroacoustic transducer and the sensor, the controller using data from the sensor to control an output property of the electroacoustic transducer.

18. The cleaning applicator system of claim 17, wherein the output property is at least one item selected from the group consisting of frequency and amplitude.

19. The cleaning applicator system of claim 17, wherein the sensor is at least one item selected from the group consisting of a temperature sensor and a pressure sensor.

20. A cleaning applicator system, comprising:
   a cleaning pad comprising Melamine resin foam that converts energy from waves or vibrations into heat; and
   an applicator comprising:
      a handheld base configured to receive the cleaning pad; and
      an energy emitter selectively providing waves or vibrations to the cleaning pad for heating the Melamine resin foam while the cleaning pad is received by the handheld base.

21. The cleaning applicator system of claim 20, wherein the cleaning pad is a rectangular prism, a makeup cleansing pad, or a dental applicator.

* * * * *